United States Patent [19]

Foroudastan et al.

[11] Patent Number: 5,341,303

[45] Date of Patent: Aug. 23, 1994

[54] METHOD OF DEVELOPING COMPLEX TOOL SHAPES

[75] Inventors: Saeed D. Foroudastan, Antioch; Mitchell C. Holman, Smyrna, both of Tenn.

[73] Assignee: Avco Corporation, Providence, R.I.

[21] Appl. No.: 37,722

[22] Filed: Mar. 25, 1993

Related U.S. Application Data

[63] Continuation of Ser. No. 743,745, Aug. 12, 1991, abandoned.

[51] Int. Cl.$^5$ .............................................. G06F 15/46
[52] U.S. Cl. ................................. 364/468; 364/474.07; 364/476; 72/702; 148/502; 148/695
[58] Field of Search ................... 364/474.07, 472, 468, 364/476, 477; 72/702; 29/DIG. 2; 148/502, 501, 500, 695

[56] References Cited

U.S. PATENT DOCUMENTS

| | | | |
|---|---|---|---|
| 4,819,467 | 4/1989 | Graf et al. | 72/702 |
| 4,989,439 | 2/1991 | Ewert et al. | 72/296 |
| 5,168,169 | 12/1992 | Brewer, Jr. et al. | 364/474.07 |

OTHER PUBLICATIONS

"Age Forming Integrally Stiffened, Aluminum Aerospace Structures in an Autoclave", Brewer, H., (AIAA 89-2087), AIAA/AHS/ASEE Aircraft Design, Systems and Operations Conference, Seattle, Wash., Jul. 31-Aug. 2, 1989, pp. 1-12.

"Autoclave Age Forming Large Aluminum Aircraft Panels", Holman, Mitchell C., Journal of Mechanical Working Technology, 20 (1989) 477-488, Elsevier Science Publishers B.V., Amsterdam.

"Age Forming Technology Expanded in an Autoclave", Hambrick, D. M., Society of Automotive Engineers, Inc., 1986 pp. 4.649-4.663.

"Metallurgy of Heat Treatment and General Principals of Precipitation Hardening", Ch. 5 Aluminum–Properties and Physical Metallurgy, Ed. Hatch, J. E., American Society for Metals, Metals Park, Ohio, 1984, title page, copyright page, table of contents (2 pages), pp. 134-139 and 177-193.

"Age Forming Aluminum in An Autoclave", H. Brewer, Jr. and M. Holman, World Aerospace Technology 1990 Publications International Limited, London, 1990 cover, pp. 3, 7, 11, and 41-46.

Miller, A. K., and Sherby, O. D., "A Simplified Phenomenological Model for Non-Elastic Deformation: Prediction of Pure Aluminum Behavior and Incorporation of Solute Strengthening Effects," Acta Metallurgica, vol. 26, 1978, pp. 289-304.

Primary Examiner—Jerry Smith
Assistant Examiner—Steven R. Garland
Attorney, Agent, or Firm—Perman & Green

[57] ABSTRACT

A method is disclosed for developing the contours of forming tools for fabricating metal members of complex shape such as wing skin and fuselage panels for aircraft. A computer simulation is performed of the age forming process on a geometrical representation of a member having the material properties of a desired metal member. The age forming process includes the steps of: a) overforming an unformed member in a tool having a contour of smaller curvature than the contour of the desired member; b) constraining the unformed member in the overformed condition; c) applying a thermal aging cycle to the member; d) cooling the constrained member following the thermal aging cycle; and e) releasing the constrained member from the condition imparted by step (b) and allowing it to spring back to a dimensionally stable condition which defines the desired member having a surface contour of complex shape. From the simulation, the contour of smaller curvature in step (a) to produce the desired metal member following step (e) is determined.

24 Claims, 7 Drawing Sheets

METHOD OF DEVELOPING COMPLEX TOOL SHAPES

This is a continuation of copending application Ser. No. 07/743,745 filed on Aug. 12, 1991, now abandoned.

BACKGROUND OF THE INVENTION

1. Field of the Invention

The present invention relates generally to a method of developing the contours of forming tools for metal members exhibiting complex shapes and, more particularly, to such a method which utilizes the principles of age forming for forming the member being fabricated. The techniques of the present invention represent an improvement over those disclosed by H. Brewer and M. Holman in commonly assigned U.S. application Ser. No. 07/713,399, filed Jun. 10, 1991, now U.S. Pat. No. 5,168,169 entitled "Method of Tool Development".

2. Description of the Prior Art

The complex shapes of the contoured members that make up aerospace structures are inherently difficult to form. Due to the shapes required by aerodynamics and because of the emphasis on load carrying capability combined with weight efficiency, optimized designs are created that require complex contours to be produced in high strength metals. Examples of such contoured members would include wing skin panels, fuselage panels, and structural stiffening elements such as spars and stringers for aircraft applications; as well as the shroud, skirt, and tankage members of space launch vehicles. Such members are characterized by extreme metal thickness variations and integrally machined features. The criticality of design requires precise forming tolerances be maintained without sacrificing the fatigue life, reliability, or strength of the member as a result of the forming process chosen.

Conventional forming methods, such as roll forming, brake forming, stretch forming, and peening, are cold working processes that achieve permanent deformations through the application of mechanical bending and/or stretching. Achieving uniform forming across integrally machined features or abrupt changes in thickness may not be possible without specialized tooling or extensive modifications to the forming equipment. In some cases, it may not be possible to develop the deformation forces necessary to accommodate extreme material thicknesses.

While various machines can handle a wide range of metal thicknesses, it is not practical to form metals varying from one extreme of the thickness range to the other, since most machines must be set up prior to operating. From this standpoint, skin tapers and recesses that occur within a panel may not be formable. Forming applications that have openings or cutouts machined into them may not be formable without distorting the opening or leaving flat spots in the contour. Other processes are limited by the size of the forming machinery and those applications that will fit within the working envelope. Custom equipment for larger or smaller applications can be prohibitively costly and inflexible.

In addition to the physical limitations imposed by part geometry are characteristic traits that result from the forming process used. Traits such as strain hardening, residual stresses, and marking accompany many of the forming processes commonly employed. In some cases these effects can produce desirable qualities, such as stress corrosion cracking resistance. Likewise others can produce undesirable qualities, such as a negative effect on the fatigue life and reliability of the formed part. The point to be made is that each forming process must be carefully matched to the intended application.

All of the conventional forming processes mentioned have one important disadvantage in common: each requires the expertise of a skilled operator. With the exception of some processes which have been automated to an extent, considerable operator skill is required to obtain tight tolerances; therefore, process consistency is low. Part to part variations in contour can result in engineering specified contour rework being required on every unit produced. Contour variations that do not require post forming corrections can still cause fit-up problems at assembly. Contour variations from part to part create numerous manufacturing difficulties, each with costly solutions.

In the recent past, a significant advancement of known techniques for forming complex members while maintaining or even improving upon their inherent strength characteristics has been devised. Known as age forming, it is a process that offers many solutions to the problems encountered when conventional cold forming processes are applied to complex shaped contoured members. During age forming, a part is restrained to a predetermined tooling contour and precipitation aged. Age forming is a process that utilizes the phenomenon of metallurgical stress relaxation during precipitation heat treatment for the purpose of converting elastic strain to a plastic state.

The age forming process may be performed on any of the precipitation heat-treatable, metals and metal alloys such as aluminum alloys in the 2xxx, 6xxx, 7xxx, and 8xxx series.

For example, to date, the age forming process of the invention has been successfully employed on at least the following aluminum alloys:

| | |
| --- | --- |
| 2xxx Series: | 2014 |
| | 2024 |
| | 2124 |
| | 2214 |
| | 2219 |
| | 2419 |
| | 2090 |
| 6xxx Series: | 6013 |
| | 6061 |
| 7xxx Series: | 7075 |
| | 7150 |
| | 7475 |
| 8xxx Series: | 8090 |

Age forming is performed according to standard heat treatment cycles utilized in precipitation hardening of alloys. The underlying principles of precipitation heat treating are explained in "Aluminum Properties and Physical Metallurgy", Edited by John E. Hatch, *American Society for Metals* Metals Park, Ohio, 1984, pp. 134–138 and 177–188, which is incorporated herein in its entirety by reference. As a result, suitable applications require the final condition of the formed components to be in an artificially aged temper. Every end use of a structure must be reviewed in light of the property changes that occur as a result of artificial aging. In some cases, the mechanical properties associated with an artificially aged temper may not be suitable for an intended application. As an example, aluminum alloy 2024 loses fracture toughness as it is artificially aged from the T3. to the T8 temper. This change presents a barrier to age forming applications where fracture toughness is a key design element, such as lower wing skins and fuselage panels for aircraft. Material and/or design changes are required in these cases to allow for the utilization of age forming. In other cases, age forming allows the added benefit of being able to produce contours in a strengthened temper, without developing high levels of residual stress within the component. An example of this feature is provided when aluminum alloy 7150 is age formed from the soft W temper to the hardened T6 temper.

More recently, the conventional age forming process has been modified and substantially improved through the use of the autoclave. The autoclave is a computer controlled pressure vessel, with the added benefit of being a certifiable source for heat treating aluminum. Age forming has traditionally been performed in a furnace, where a mechanical means of constraining the part to the predetermined forming shape is required. The autoclave offers the advantage of using vacuum and internal pressure to obtain the desired contour. Since pressure acts uniformly about the surface of the part, integrally machined features receive the same deformation force as the rest of the panel. Another important advantage is that the forming pressure is distributed about the entire surface area of the part. Therefore, a small differential pressure can equate to many tons of applied force when acting over a large surface. Most conventional processes concentrate the forming forces over a small area, thereby restricting the total available deformation force.

The autoclave is computer controlled allowing high levels of process consistency and accuracy. Computer control allows the process to be operator independent. A separate computerized system closely monitors and records the pressure and temperature within the autoclave providing traceability and process verification. These two features inherently endow autoclave age forming with high levels of process consistency and accuracy. Each panel receives the same processing; consequently, repeatability is ensured. It is this feature that makes the process adjustable. The tooling contour is "fine tuned" until the desired results are obtained.

Tooling for the autoclave is designed according to the springback anticipated for the application. Springback refers to the tendency for a member being formed to return to some shape intermediate its original shape and that of the tool to which it is subjected during heat treatment. This phenomenon will be discussed at length below. Forming tools are designed with removable contour boards and other features that allow for rapid contour modifications. Unlike other forming processes, age forming does not typically allow for multiple forming iterations to be performed upon the same piece. Age forming is a heat treatment process; therefore, running a part more than once could result in over aging the material. Until the tooling contour is finalized, contour corrections must be performed by another forming process. Once the final tool contour is reached, secondary corrective forming processes are not necessary.

This inability to repeat the heat treatment process on a member being fabricated requires that it be scrapped if it exhibits an incorrect final contour and the procedure repeated with a new member. The cost of labor and materials for such necessarily repeated iterations of the process have led to the methods of the present invention.

SUMMARY OF THE INVENTION

A method is disclosed for developing the contour of tools employed for forming metal members exhibiting complex shapes. The members are precipitation, heat-treatable, metals or metal alloys which are autoclave age formed. The resulting member is formed to the desired contour and, simultaneously, is heat treated to reduce residual stresses while improving its strength characteristics. The invention is particularly concerned with a new tooling contour prediction method which is based upon the application of a unified viscoplastic model simulating the age forming process.

The method of the invention assures proper results on the first occasion the tool is used, thereby resulting in considerable savings of labor and material.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

In order to gain a better understanding of the phenomena behind the age forming process of the invention, it is well to separately consider and analyze the forming mechanisms at work during the age forming process. This effort can begin by analyzing mechanical forming versus age forming in terms of stress distribution found within the cross section of a specimen undergoing forming. Another tool desirably utilized for analysis is a stress-strain curve representing the outside layer of fibers of a specimen undergoing forming. Through the use of these tools, a clearer picture can be obtained as to how each forming method works to form a piece of material.

Figure 1:
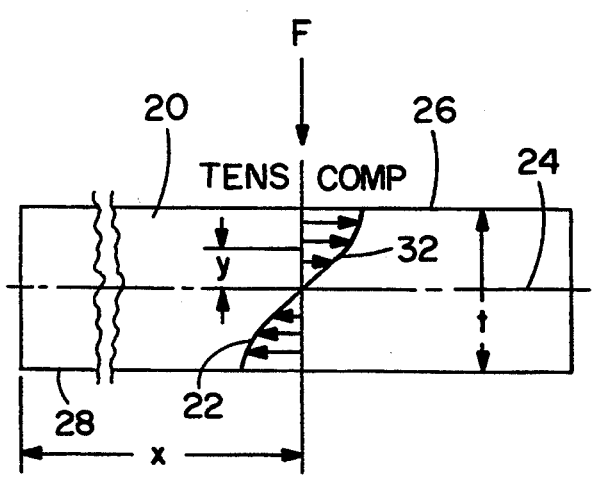
FIG. 1 is a diagrammatic side elevation view illustrative of stress distribution in a constant thickness bar being subjected to pure bending for purposes of explanation of the invention.

Considering the stress distribution throughout a part 20, depicted for simplicity in FIG. 1 as a constant thickness bar of rectangular cross section, allows a comparison to be drawn between different forming mechanisms. As a force F is applied to the simply supported bar to cause it to assume a radius, stresses diagrammatically indicated at 22 are distributed throughout the thickness of the bar. A neutral surface 24 experiences no stress due to pure bending while the outside fibers experience the greatest stress. A concave side 26 of the bar experiences compressive stresses while a convex side 28 of the bar experiences tensile stresses. According to Hooke's Law, stress is directly proportional to the strain that is experienced when it is within the elastic range of the material. The proportionality constant is known as the modulus of elasticity and is dependent upon material and temperature. The strain experienced by the fibers across the thickness of a specimen depends upon the distance of a particular layer of fibers from the neutral surface.

Figure 2:
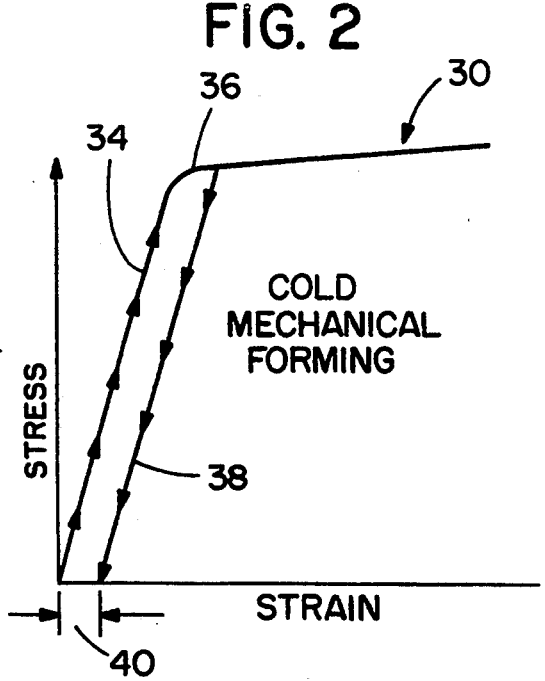
FIG. 2 is a stress-strain graph illustrating the relationship between stress and strain in the outermost layer of material of the bar of FIG. 1 during a cold mechanical forming process, depicting both the elastic range of the material and the deformation in the material after it has been stressed beyond the yield strength of the material.

If the stress induced throughout the bar stays within the elastic range of the material, the bar will return to its original flat configuration with no forming taking place once it is released. Therefore, if the bar is to retain a contour and be formed without the aid of thermal stress relaxation, a significant amount of fibers within the material must be stressed beyond their yield point. The stress-strain curve 30 in FIG. 2 can be used to examine the action involved in forming. The case of imparting a radius to a flat bar shaped part is not strictly a tensile application; rather it is one of bending. Therefore, in reality, the use of a stress-strain curve is only applicable to a single layer of material at a given distance from the neutral surface. Nevertheless, it serves the purpose of illustrating the differences between cold mechanical forming and age forming. For example, the stress-strain curve 30 in FIG. 2 illustrates cold mechanical forming of the bar 20 of FIG. 1 subjected to bending stresses.

Consider the outermost layer of material on what will become the convex side 28 of the bar. Initially the bar is flat and in a stress free state. As the bar is reconfigured to assume a radius, the fibers in the outside surface layer are strained which induces stress. This is illustrated by a stress distribution line 32 (FIG. 1) and by the stress-strain curve (FIG. 2) beginning at the origin. The linear portion of the curve, which defines the modulus of elasticity, or Young's modulus, for the particular alloy of the bar 20, continues until the stress level reaches the yield strength 36 of the material. If the bar is released at any point prior to inducing a stress greater than the yield strength 36, it will unload along this same line and return to a flat (i.e., strain free) condition. Once a layer of material is stressed beyond its yield point, the relationship between stress and strain is no longer directly proportional (i.e., it is no longer linear). If at this point the bar is released, it will unload along a line 38 that has the same slope as the linear portion 34 of the load curve 30 but will be offset from the original load line 34 indicating a retained strain 40. The slope is equal to the modulus of elasticity as previously noted. The resulting retained strain 40, referred to as plastic strain, indicates that permanent deformation has taken place.

Figure 3A:
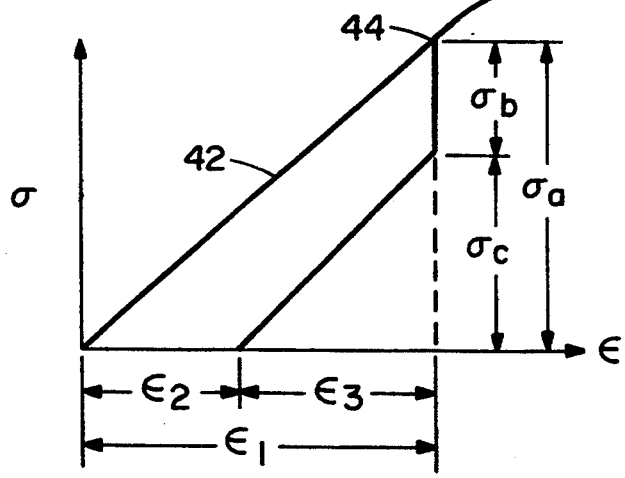
FIG. 3A illustrates a stress-strain graph, similar to FIG. 2, but indicating the result of an age forming process performed within the elastic range of the material.
Figure 3B:
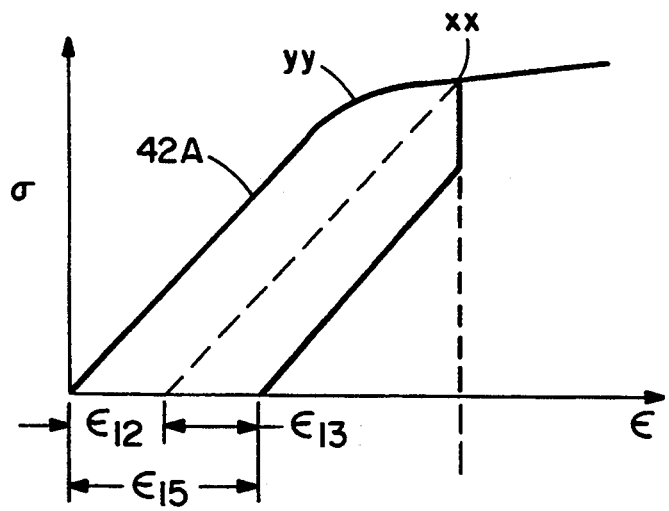
FIG. 3B is a stress-strain graph, similar to FIG. 2, but indicating the result of an age forming process performed when initial loading exceeds the yield point of the material.

Age forming forms a structure by taking advantage of the stress relaxation phenomena associated with artificial aging. The age forming concept is illustrated by the stress-strain curves in FIGS. 3A and 3B. FIG. 3A depicts a specimen initially stressed below the material's yield strength and FIG. 3B depicts a specimen initially stressed beyond the material's yield strength. Again, consider the outside layer of fibers on what will become the convex side of a formed member, such as convex side 28 of the bar 20 of FIG. 1. These fibers will experience tensile stresses. As the member is strained as indicated by a line 42 (FIG. 3A), the stress level increases proportionally. The vertical distance $\sigma_a$ (FIG. 3A) represents the amount of stress experienced by the fibers of the member while the horizontal distance $\epsilon_1$ represents the amount of strain experienced. Upon reaching a particular radius, the member is held at this constant strain level (as at point 44) and the artificial aging cycle is applied. Due to the metallurgical stress relaxation resulting from the materials' exposure to temperature, the stress level reduces even though the strain remains constant. The amount of stress relaxation that occurs, as indicated at $\sigma_b$, depends upon the material and its related aging temperature as well as the initial level of stress induced. The rate of stress relaxation is greatly enhanced by a higher initial stress level and by a higher aging temperature. However, these factors are limited by the temperature permitted by the selected aging cycle. Once the aging is complete, the member is cooled and released from its constraints. This allows the member to spring back and physically relax the remaining induced stress. The vertical distance $\sigma_c$ (FIG. 3A) represents the amount of stress relaxed during spring back while the horizontal distance $\epsilon_3$ represents the change in strain. Since strain changes, the shape of the specimen also changes. In this case the specimen is held in contact with the smaller radius of a forming tool and, upon release and following spring back, assumes a larger radius. An amount of strain $\epsilon_2$ is retained by the member indicating permanent deformation.

In FIG. 3A, the practice of age forming has been illustrated within the elastic range of the material. It is in this region that the distinction between age forming and cold mechanical forming is most evident. However, the same principles apply within the inelastic range (above yield) as depicted in FIG. 3B. The most notable difference between age forming a specimen stressed within the elastic range versus one stressed within the inelastic range is best viewed by considering the action along the strain (horizontal) axis. In a specimen stressed to within the inelastic range, the retained strain $\epsilon_{15}$ (FIG. 3B) is composed of two components. A portion of the retained strain $\epsilon_{12}$ results simply due to stressing the specimen beyond the yield point of the material. In FIG. 3B, point xx represents the specimen initially reconfigured to the shape of the forming tool prior to exposure to the aging cycle. At this point, the level of stress is beyond the yield strength of the material. The yield strength is illustrated on the stress-strain curve 42A by point yy. If the specimen being formed were to be released at point xx, prior to exposure to the elevated temperature of the aging cycle, some retained strain $\epsilon_{12}$ would be exhibited simply because a portion of the material has yielded. This is unlike the specimen illustrated in FIG. 3A in which the specimen would return to a flat unstrained condition if released prior to elevated temperature exposure. The total retained strain $\epsilon_{15}$ of FIG. 3B, therefore, is a combination of the retained strain $\epsilon 12$ due to yielding of the material and the retained strain $\epsilon_{13}$ due to metallurgical stress relaxation.

In either the elastic or inelastic range, age forming allows permanent deformation to be achieved with lower levels of applied stress than cold mechanical forming. Because of the way that cold mechanical forming works, residual stress levels within formed parts can be quite high. It is here that age forming presents significant advantages. First, the applied stress level required for forming is lower; and secondly, stress relaxation occurs during aging, lowering it even more while the part is held at a constant strain. After release from the forming tool, the age formed part relaxes the remaining induced stress, which is significantly lower than it was at the start of the aging cycle. The result is that the age formed part has the same permanent deformation as the mechanically formed part, but with much lower levels of residual stress.

The amount of stress relaxation experienced by a member during forming becomes the key to determining the amount of springback the member will experience following age forming. Predicting springback is the fundamental requirement to taking advantage of the age forming method. Knowledge of springback is needed to accurately determine forming tool contours.

Figure 4:
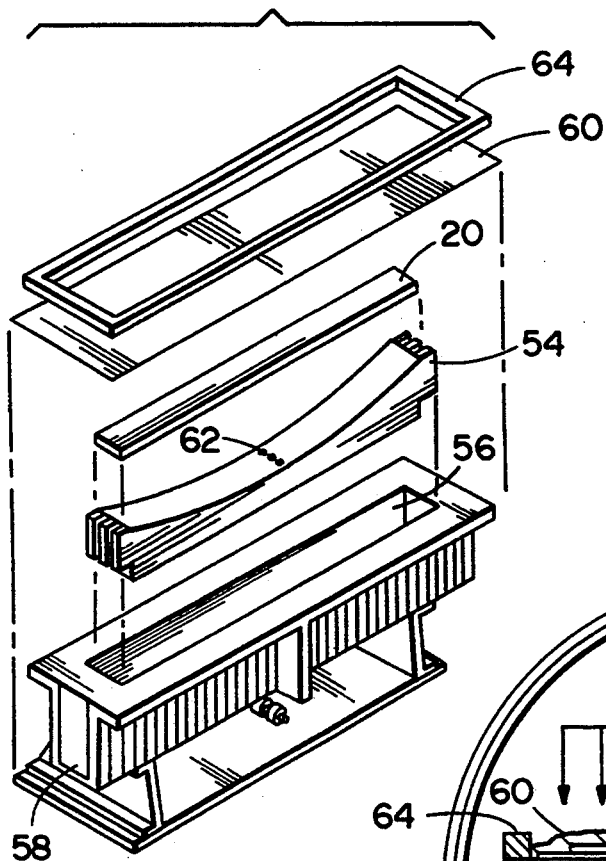
FIG. 4 is a perspective view, exploded, illustrating tooling for autoclave age forming a member such as the bar of FIG. 1.
Figure 5:
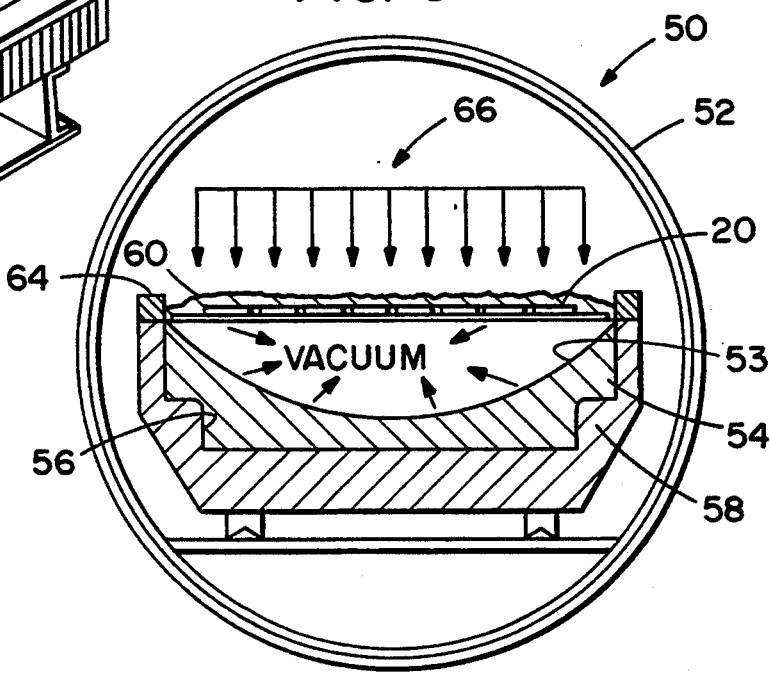
FIG. 5 is a detail cross section view illustrating the items shown in FIG. 4 within an autoclave.

For a brief initial explanation of the autoclave age forming process utilized for purposes of the invention, turn now to FIGS. 4 and 5. An autoclave 50 (FIG. 5) includes a generally thick-walled cylindrical vessel 52 which may typically be capable of withstanding pressures up to 200 psi, total vacuum, and temperatures up to 600° F. With this apparatus, as diagrammatically seen in FIG. 6, the part 20 is forced from an initial unformed condition (FIG. 6A) into intimate contact with the contoured surface 53 of a concave die 54 (FIG. 6B) receivable in a cavity 56 of an autoclave forming tool 58. This is accomplished by covering the top of the part 20, die 54, and forming tool cavity 56 with a temperature resistant vacuum blanket 60, sealing the edges of the blanket, drawing a vacuum through a plurality of vacuum ports 62 (FIG. 4) on the tool cavity beneath the part, and, if desired, also applying pressure to the upper surface of the part. A sealing frame 64 is removably mounted on the forming tool 58 to maintain the positioning of the vacuum blanket 60. The vacuum pulled underneath the part ensures that trapped air will not prevent it from obtaining total contact with the forming tool. The forming tool contour is designed to overform the part, allowing for springback. As noted above, pressure may be optionally applied to the part as indicated by arrows 66 to assure firm and continuous coextensive engagement of the die 54 by the part 20.

Figure 6A:
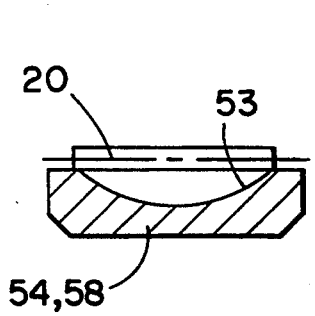
FIGS. 6A, 6B, 6C are successive diagrammatic detail end elevation views, partially in section, illustrating successive steps of the age forming method of the invention.
Figure 6B:
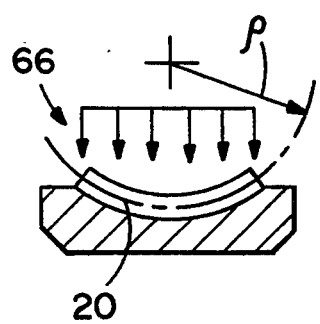
Figure 6C:
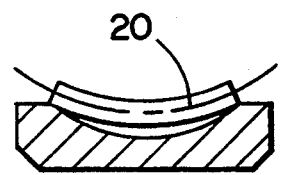

Up to this point, temperature has not been applied to the part, so that unless the bending stress applied has exceeded the yield point of the material, no permanent deformation has been achieved and the part is still within the elastic range of the stress strain diagram. This condition provides the most significant feature of age forming, since it can be performed at lower applied stress levels than conventional forming techniques. If the part were released from the vacuum and pressure holding it to the tool, it would essentially spring back to its initial flat condition (FIG. 6A). However, with the application of heat at appropriate temperatures for appropriate periods of time, the part will, after the forming process and after its release from the tool, spring back to an intermediate position as indicated in FIG. 6C.

The foregoing presents an early construction of an autoclave tool suitable for the process of the invention. However, it is not all inclusive. More recently, tools have been constructed with a skeleton framework of contoured boards covered by a contoured aluminum skin or caul plate. The pressure differential is created between the top of the panel and the caul sheet. The contour boards are not exposed to the pressure differential, except for those forces transmitted through the caul. A sealing frame is no longer employed to seal the vacuum bag to the tool. Instead, the vacuum seal is now maintained by adhesively attaching the bag to the surface of the caul with a temperature resistant putty. The newer tooling is simple, light-weight, and less costly to build. Nor does the tooling have to be concave; it can just as easily be convex. Also, production tools are not generally cylindrical, although individual contours are constructed of circular segments. While vacuum and pressure are preferably employed to obtain the appropriate applied strain, purely mechanical expedients, such as matched dies or clamps, may also be used. Much of the tooling is simply a function of the desire to use a pressure differential for forming. Age forming itself can be employed in both autoclaves and furnaces using both pressure and mechanical means. The method for developing the forming tool contour is the same, regardless of whether a pressurized autoclave tool or a mechanically clamped furnace tool is desired. Springback is calculated as a function of the material, its thickness, and the final contour desired only. Regardless of whether age forming is performed in a furnace or autoclave, the material's response to aging remains the same.

Until the advent of the present invention, springback was defined as the difference between the chord height of the tool and the chord height of the formed specimen. However, it was found that this method was very restrictive and limited to predicting the springback of a constant thickness bar specimen formed to a radius. The old method was based purely on the percent change in chord height. The stress-strain curve was not used. This method was improved by using the stress relaxation curve and strain retention curve prediction method as indicated in U.S. Pat. No. 5,168,169 recited above, the disclosure of which is hereby incorporated herein in its entirety by reference. However, the improved method, just noted, is based on experimental observations and was limited to the range of test data that was used.

Figure 7:
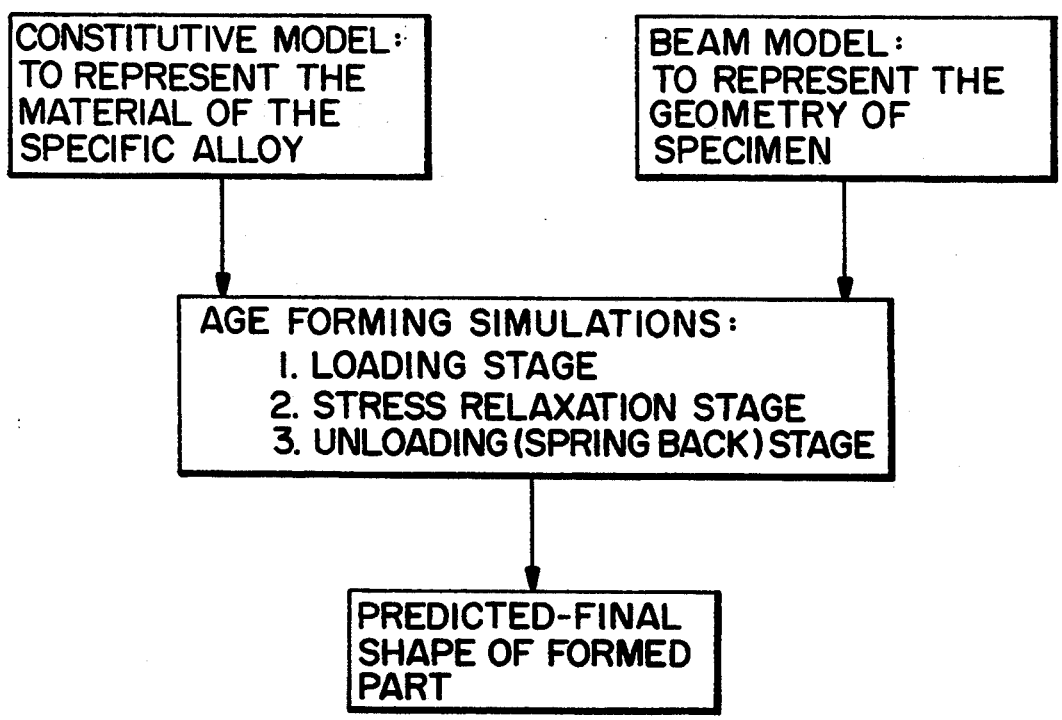
FIG. 7 is a basic flow chart of the simulation model of the invention.

A new springback prediction method which forms the basis of the present invention is based upon the application of a unified viscoplastic model to simulate the age forming process, providing a much more complete analytical device than previously available to the tool designer. The age forming method can be broken down into its various stages: loading, stress relaxation, and springback. A basic flow chart depicting this method is presented in FIG. 7. In the present method, equations representing the condition model are used to more fully describe what is physically and metallurgically happening to the material being formed. These equations attempt to describe the laws governing the physical nature of the material and changes taking place during the age forming process.

They represent physical phenomena such as: elastic strain, inelastic strain, stress relaxation, creep, and the like, and the history of time dependent load application and temperature exposure. Unique constants are required to accurately represent specific materials. The constants are determined by manipulating the constitutive equations until they represent the age forming process physically observed in test specimens.

Once determined, the constants in conjunction with the constitutive model fully represent the material at hand as it undergoes the age forming process.

Theoretically, any model geometry can then be analyzed to determine needed age forming tool contours. More properly, this method is a modelling and simulation technique rather than a prediction technique.

Mathematical modelling and simulation of age forming is flexible and incorporates material properties and part geometry in an appropriate format. The model uses this information to obtain the desired contour of a specimen being formed and to predict the residual stress in that specimen. Integrating materials, as represented by the constitutive model, and geometry into the model for the forming method allows it to be adaptable to different combinations of part configuration and metal alloy.

The benefits of a mathematical modelling and simulation of the age forming method relate to the ability to know the degree of deformation required to compensate for material springback and the characteristic forming tendencies associated with a specific part configuration. The main benefit would be to analytically determine the forming parameters thereby eliminating the need for developing costly and time consuming empirical data.

The procedure to obtain the basis for the present invention will be divided into the following sections:

INTRODUCTION

In autoclave age forming, a metal part is heated to a temperature sufficient for it to exhibit creep and stress relaxation. It is then subjected to pressure which forces it against a tool or mold. Creep may facilitate this process. Once it contacts the tool, the part is held in place by the pressure for a period of time to allow stress relaxation to relieve the stresses produced by forming. Finally the part is released and it partially springs back to a shape somewhere between its original shape and the tool shape.

From the above description, it can be seen that the process is quite complex. A variety of mechanical phenomena including elastic deformation, plastic deformation, creep, and stress relaxation are potentially involved. This complexity of mechanical response makes the use of a unified model of elastic and inelastic behavior attractive.

CONSTITUTIVE MODEL

A mechanical model capable of a unified description of yielding, creep, and stress relaxation is needed. The constitutive model also should have structure involving evolution equations for measures of inelastic strain and a set of internal variables. Microscopic concepts can be used in determining the forms of the equations governing the evolution of the internal variables. The evolutionary nature of the method of the invention allows a smooth transition from elastic to inelastic behavior and thus eliminates the need for the explicit inclusion of a yield criterion. After investigating several possibilities, the Miller and Sherby constitutive model (see Miller, A.K., and Sherby, O.D., "A Simplified Phenomenological Model for Non-Elastic Deformation: Prediction of Pure Aluminum Behavior and Incorporation of Solute Strengthening Effects," *Acta Metallurgica*, Vol. 26, 1978, pp. 289–304) was finally selected. The chosen model is potentially well suited for the simulation of a complicated process such as age forming in which the relative contributions of such phenomena as yielding, creep, and stress relaxation are initially unknown. In a beam model, only the one dimensional forms of the Miller and Sherby equations are needed. These are in a form and notation somewhat different from that used in Miller and Sherby, for convenience, but not substantially different:

$$\tau + (E/\tau)(\sinh(\sigma^2/(E^2 f)))^n = E\epsilon \quad (1)$$

$$\dot{f} = (\alpha/\tau)((\sinh(\sigma^2/(E^2 f)))^n - (\sinh(\beta^2 f))^n) \quad (2)$$

$$f(0) = f_o \quad (3)$$

where a superposed dot indicates differentiation with respect to time (t).

The symbols $\sigma$, $\epsilon$, and f represent, respectively, stress, total strain, and an internal variable which is a dimensionless form of the quantity called the drag stress in Miller and Sherby. The inclusion of the internal variable f provides a mechanism for roughly modelling the internal structural changes responsible for inelastic behavior. The quantities $\alpha$, $\beta$, $f_o$ and n are material constants while E and $\tau$ are temperature dependent material properties. The physical interpretations of $\alpha$, $\beta$, $f_o$, and n are discussed by Miller and Sherby. The quantity E is the familiar Young's modulus of elasticity, and the quantity $\tau$ is a relaxation time.

In order to utilize the Miller and Sherby model to simulate the behavior of a specific material, a set of material constants appropriate for that material must be determined. In the present work this was done with reference to uniaxial constant strain rate tension tests, uniaxial constant stress creep tests, and uniaxial constant strain stress relaxation tests which are conducted for the desired alloy.

All the tests mentioned above involve uniaxial loading under quasistatic conditions. For these circumstances, the quantities $\sigma$, $\epsilon$, and f can be regarded as constant throughout the specimen. The equations (1) and (2) are a set of two simultaneous differential equations which can be solved to determine either $\sigma(t)$ and $f(t)$ when $\epsilon(t)$ is given (as in the tension and stress relaxation tests) or $\epsilon(t)$ and $f(t)$ when $\sigma(t)$ is given (as in the creep tests). The problem of carrying out the solution of equations (1) and (2) numerically is complicated by the numerical stiffness of the system.

In the present work it was decided to employ the Euler two point forward difference method and to deal with numerical stiffness by using a very small constant step size. This procedure was verified by reproducing several simulations reported by Miller and Sherby for pure aluminum using the material constants given in the first column of Table 1.

TABLE 1

| | Material Constants | |
|---|---|---|
| | Pure Aluminum | 7075 Aluminum Alloy |
| $\alpha$ | $4.70 \times 10^7$ | $5.00 \times 10^3$ |
| $\beta$ | $5.50 \times 10^3$ | $3.75 \times 10^2$ |
| n | 4.70 | 5.00 |
| $f_o$ | $3.30 \times 10^{-9}$ | $3.00 \times 10^{-9}$ |
| $\tau$ | $2.97 \times 10^{14}$ sec | $6.06 \times 10^7$ sec |
| E | $6.96 \times 10^7$ kpa | $6.55 \times 10^7$ kpa |

It was found that any sudden application of stress or strain produced numerical difficulties. Thus creep tests were simulated by increasing the stress to its final constant value over a time which was small compared to the duration of the test and stress relaxation tests were simulated by increasing the strain to its final constant value over a time that was small compared to the duration of the test.

Because of the complicated structure of equations (1) and (2), it is impossible to identify each of the material coefficients with a unique aspect of the material and response. Thus, the determination of the coefficients involves a trial and error process based on a large number of simulations. In the present work a procedure similar to that described by Miller and Sherby was used to obtain initial estimates of the constants. This procedure is based on data from uniaxial creep tests and uniaxial tension tests. These estimates were then refined using the available data for uniaxial stress relaxation tests. For example, the values ultimately selected as appropriate for age forming simulations of 7075 aluminum alloy are given in the second column of Table 1.

BEAM MODEL

A part could be represented by a simply supported beam subjected to uniform pressure. It is assumed that the contact between the tool and the part is established everywhere simultaneously and that the contact pressure can be treated as uniform.

It should be noted that, consistent with the above discussion, during the contact phase the pressure appearing in the subsequent equations represents the difference between the applied pressure and the contact pressure. The beam model will first be developed in a form suitable for the solution of any bending problem and then specialized to the age forming problem.

Figure 8:
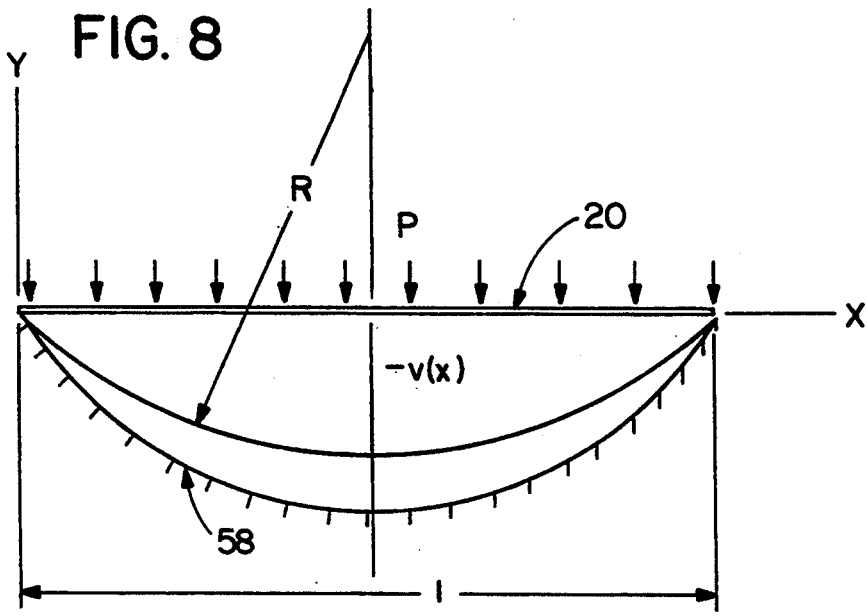
FIG. 8 is a diagrammatic cross section view of a forming tool and unstressed part thereon presented on Cartesian coordinates.

To develop the appropriate equations for quasistatic bending let the x,y plane be the plane of bending with the x axis being horizontal and the y axis vertically upward (see FIG. 8). The undeformed neutral axis corresponds to $y=0$. The cross section of the beam is characterized by an area A and a moment of inertia about the neutral axis $$I = \int\int_A y^2 dA \tag{4}$$

The bending moment is defined to be $$M(x,t) = -\int\int_A \sigma y \, dA \tag{5}$$

The vertical displacement of the neutral surface is $v(x,t)$.

In the beam model the stresses and strains can vary with x and y as well as t. Thus, the superposed dots appearing in equations (1) and (2) must be replaced by partial derivatives with respect to t. Doing this and substituting the geometric relationship $$\epsilon = y/R(x,t) = -y\kappa(x,t) \tag{6}$$

(R being the radius of curvature of the neutral surface and $\kappa$ being its curvature, that is, 1/R) into equations (1) and (2) yields $$\delta_t\sigma + (E/\tau)(\sinh(\sigma^2/(E^2 f)))^n = -Ey\delta_t\kappa \tag{7}$$

$$\delta_t f = (\alpha/\tau)(\sinh(\sigma^2/(E^2 f)))^n - (\sinh(\beta^2 f))^n) \tag{8}$$

Integrating the product of y with equation (7) over the cross section and using equations (4) and (5) yields the additional equation $$\partial_t M - (E/\tau)\int\int_A (\sinh(\sigma^2/(E^2 f)))^n y \, dA = EI\partial_t \kappa \tag{9}$$

For small deflections, the relationship between curvature and displacement is $$\kappa = \delta_x^2 v \tag{10}$$

For statically determinate problems, equations (7-10) are sufficient to define the problem. For statically indeterminate problems, they must be supplemented by the quasistatic equilibrium equation $$q = \delta_x^2 M \tag{11}$$

where q is the upward loading per unit length. It is to be observed that for $t=\infty$ one integration of equation (9) with respect to t produces the usual moment curvature equation for elastic being $\kappa = M/(EI)$ and substituting this into one integration of equation (7) with respect to t yields the usual elastic flexure stress distribution $\sigma = -MY/I$.

The integral appearing in equation (9) illustrates the fact that, without further assumptions, a beam (or plate or shell) theory cannot be rendered entirely independent of the thickness coordinate when a unified model of elastic/inelastic response is employed. In the present situation this is because the variations of $\sigma$ and f with y are not given but must be determined as part of the solution.

The solution of equations (7–11) is a formidable problem. In the age forming experiments being simulated it was found that the formed parts closely resembled circular arcs. It was decided, therefore, to simplify the model by assuming that equation (10) could be replaced with the appropriate equation based on the geometry of a circular arc. Doing this allows the solution to be carried out at each cross section independently. In the present work only the central cross section, the location of the maximum stresses and displacements, was considered.

The age forming model involves a statically determinate simply supported rectangular beam (of length l, width b, and thickness h) loaded by a uniform downward pressure p (note: $q=-pb$). Thus the central moment is $$M = pbl^2/8 \tag{12}$$

and the moment of inertia is $$I = bh^3/12 \tag{13}$$

Suppressing the dependence on x in equations (7–9) (since x is fixed at l/2) and using equations (12) and (13) one obtains $$\delta_t \sigma + (E/\tau)(\sinh(\sigma^2/(E^2 f)))^n = -Ey\dot{\kappa} \tag{14}$$

$$\delta_t f = (\alpha/\tau)((\sinh(\sigma^2/E^2 f)))^n - (\sinh(\beta^2 f))^n) \tag{15}$$

$$\dot{p} - (16E/(\tau l^2)) \int_0^{h/2} (\sinh(\sigma^2/(E^2 f)))^n y \, dy = 2Eh^3 \dot{\kappa}/(3l^2) \tag{16}$$

Equations (14–16) are a set of differential equations which can be used to determine $\sigma(y,t)$ and $f(y,t)$ on the central cross section together with either $\kappa(t)$ (if p(t) is given) or p(t) (if $\kappa(t)$ is given). The equation $$v = R(1 - (1 - (l/(2R))^2)^{\frac{1}{2}}); R = 1/\kappa \tag{17}$$

(see FIG. 8) is used to determine the central deflection.

Before attempting to simulate the entire age forming process, simulations are made of the process of deforming a beam by a pressure which starts at zero and increases linearly with time. The material properties for pure aluminum given previously are employed and the dimensions are assumed to be $l=76.2$ cm (30 in.), $b=7.62$ cm (3 in.), $h=1.27$ cm (0.5 in.).

The simulations are carried out as follows. In the upper half of the cross section, N points are chosen and the quantities $\sigma_i$, $\epsilon_i$, and $f_i$, $i=1,2,\ldots,N$ are associated with these points. The initial state is assumed to be quiescent, that is $$\sigma_i = \epsilon_i = 0, f_i = f_o; i = 1, 2, \ldots, N. \tag{18}$$

Since p(t) was known in this case, the governing equations were arranged in the form $$\dot{\sigma}_i = -((E/\tau)(\sinh(\sigma_i^2/(E^2 f_i)))^n + 3l^2 \dot{p}/(2h^2)) - \tag{19}$$

$$(24E/(\tau h^2)) \int_0^{h/2} (\sinh(\sigma^2/(E^2 f)))^n y \, dy)(y/h); \; i=1,2,\ldots,N$$

$$\dot{f}_i = (\alpha/\tau)((\sinh(\sigma_i^2/(E^2 f_i)))^n - (\sinh(\beta^2 f_i))^n); \; i=1,2,\ldots N \tag{20}$$

$$\dot{\kappa} = \left( 3l^2 \dot{p}/(2Eh^2) - (24/(\tau h^2)) \int_0^{h/2} (\sinh(\sigma^2/(E^2 f)))^n y \, dy \right)/h \tag{21}$$

and these $2N+1$ ordinary differential equations are integrated forward by the well known Euler method to determine $\sigma_i(t)$, $f_i(t)$, and $\kappa(t)$. It is interesting to note that, since the Euler method is being used, the integrals appearing in equations (19) and (21) are always evaluated at the previous time. Thus, no iteration is required. This may not be true for many, more complex, numerical methods.

Figure 9:
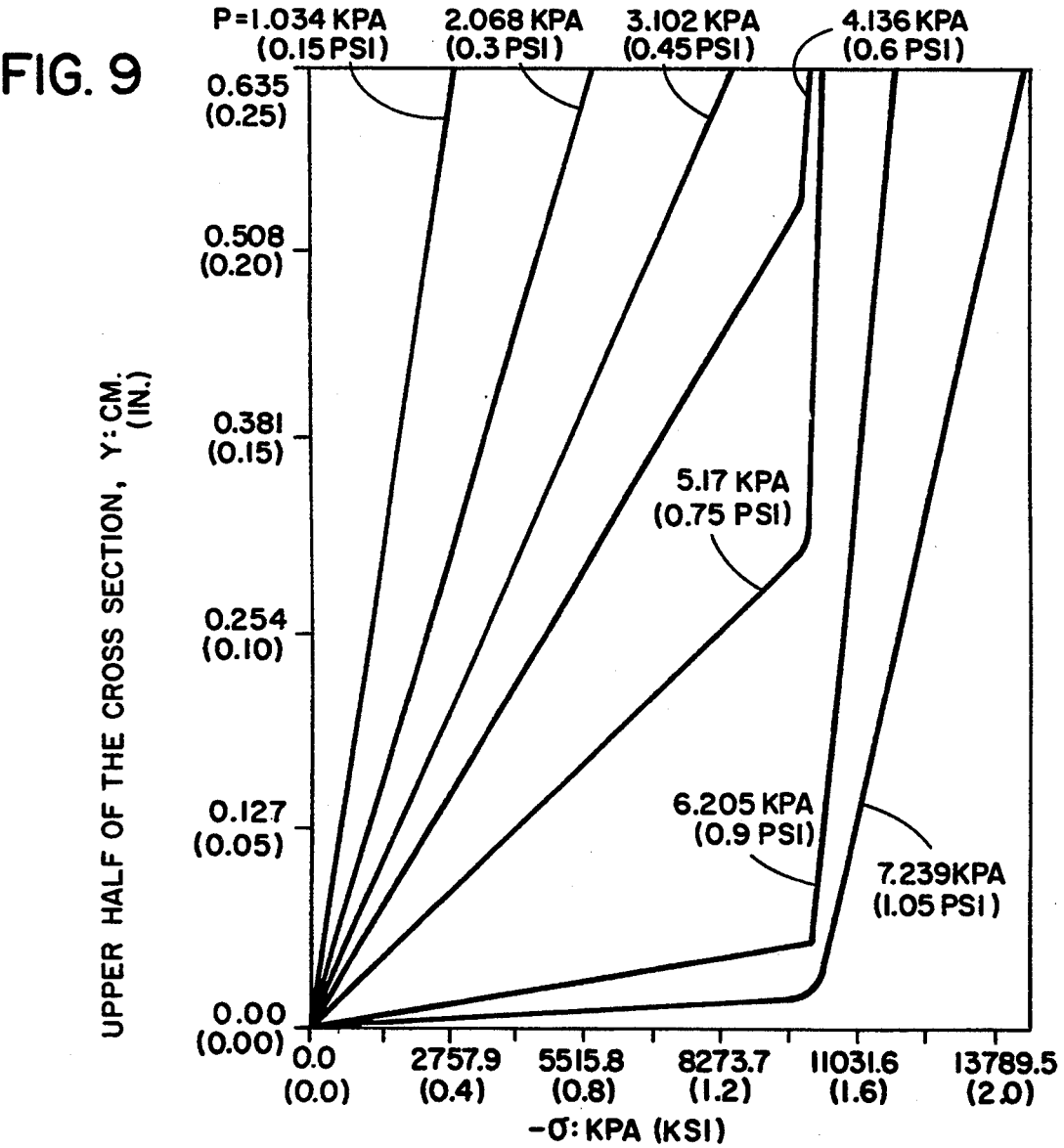
FIG. 9 is a graph depicting the predicted stress distribution on the central cross section of a member for a range of pressures to exhibit the slopes characteristics of elastic plastic response.

The capability of the present beam model is illustrated in FIG. 9 which shows the predicted stress distributions on the central cross section. For the lowest three pressures the stress distributions are linear which is characteristic of elastic response. Beginning with the fourth pressure the stress profiles exhibit the slopes characteristic of elastic plastic response. The yield stress is approximately 10 Mpa which is consistent with data reported by Miller and Sherby. The yielded region is seen to occupy an increasingly large portion of the cross section as the applied pressure is increased. For the largest pressure shown, virtually the entire cross section has yielded. It is felt that this simulation of the transition from elastic to plastic behavior (yielding) is quite good.

AGE FORMING SIMULATIONS

The age forming process consists of three stages as discussed earlier. These will be referred to herein as loading, stress relaxation, and springback.

The loading stage is simulated exactly as described at the end of the previous section. It is terminated when the part is predicted to be in contact with the tool, that is, when $R=1/\kappa$ is found to be equal to the tool radius $R_t$.

To simulate the stress relaxation stage the curvature of the part is held constant at the tool curvature (thus making $\dot{\kappa}=0$) and equations (19–21) are rearranged to read $$\dot{\sigma}_i = (E/\tau)(\sinh)\sigma_i^2/(Ef_i)))^n; \; i=1,2,\ldots,N \tag{22}$$

$$\dot{f}_i = (\alpha/\tau)((\sinh(\sigma_i^2/(E^2 f_i)))^n - (\sinh(\beta^2 f_i))^n); \; i=1,2,\ldots,N \tag{23}$$

$$\dot{p} = (16E/(\tau l^2)) \int_0^{h/2} (\sinh(\sigma^2/(E^2 f)))^n y \, dy \tag{24}$$

Equations (22) and (23) consist of N sets of two coupled equations. These are integrated forward by the Euler method to determine $\sigma_i(t)$ and $f_i(t)$. Then equation (24) is integrated forward by the Euler method to find p(t). The stress relaxation stage is terminated after 24 hours.

It is to be recalled that in the present idealized model the quantity p represents the difference between the forming pressure and the distributed reaction between the part and the tool. This quantity decreases as the stress relaxation stage proceeds. At the end of the stress relaxation stage the forming pressure is removed. This relieves the contact between part and tool, thus causing the distributed reaction between part and tool to vanish. In the simulations, therefore, the springback stage is characterized by reducing p to zero at a constant rate and then holding it there. The simulations are carried out using equations (19–21) just as for the loading stage. It has been found that changes in $\kappa$ virtually cease once p reaches zero (that is $R = 1/\kappa$ at the end of the unloading stage is equal to the part radius, $R_p$). The corresponding value of $R = 1/\kappa$ is used to characterize the amount of springback. It is also to be recalled that in the actual experiments the part is cooled before the pressure is removed. In the simulations, this cooling is accounted for by the appropriate changes in E and $\tau$ in the unloading stage.

Determining the proper amount of overform a metal member must be subjected to during age forming is critical to successfully forming the desired metal member. The more complex the desired member, whether in contour or in thickness variation, the more complex the forming tool contour must be. The unified viscoplastic model which has been described simulates the behavior of a metal item when subjected to age forming. Therefore, the model can become a key component to an overall scheme for predicting an age forming tool's contour. The following presents three schemes for such predictions. In each scheme, a complex shaped metal member of desired contour is analyzed and information from that analysis is used in conjunction with the simulation model to produce a forming tool contour.

Figure 10A:
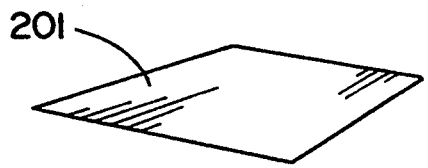
FIG. 10A diagrammatically represents a tool reference plane.
Figure 10B:
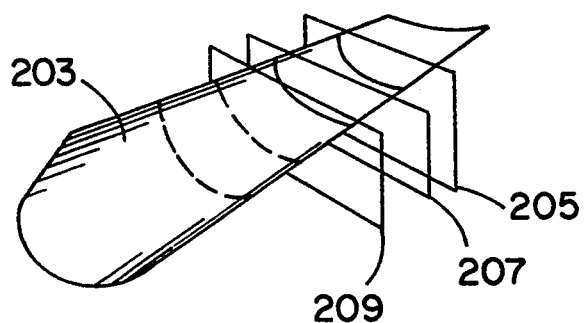
FIG. 10B diagrammatically represents a desired metal member cut by a plurality of parallel spaced apart planes perpendicular to the tool reference plane of FIG. 10A.
Figure 11A:
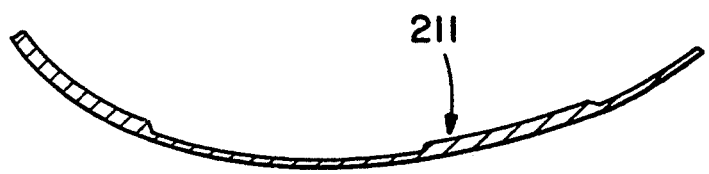
FIG. 11A is a diagrammatic representation, in section, of a cross sectional element result from the interface of one of the perpendicular planes in FIG. 10B and the desired metal member.

For example, consider a wing skin panel as the metal member requiring form. Thickness varies throughout the panel as required by its intended purpose as a wing covering. Also the shape to which it must conform is complex as defined by the airfoil shape. In order to predict the required forming tool contour, the shape of the desired metal member must be known. A scheme for analyzing the shape and thickness variations of the desired member has been developed which simulates subjecting the member to a plurality of two-dimensional cuts or slices. First, a geometrical representation of the desired member is created in an electronic three-dimensional graphics package such as that sold under the trademark "CATIA". Here the shape of the desired member can be fully described in terms of an x, y, z coordinate system. Within this medium, a plane of reference is established. This reference plane is labelled as the Tool Reference Plane (TRP) 201 (FIG. 10A). This plane represents a desired or contoured metal member 203 in a flat condition prior to forming. The desired metal member in its final configuration is illustrated in FIG. 10B. With TRP 201 established, conveniently spaced apart planes 205, 207, 209 perpendicular to the TRP 201 are used to cut or slice the desired metal member across its contour. By means of these planes 205, 207, 209, a desired metal member 203 can be defined in a two-dimensional and cross sectional format as seen in FIG. 11A. Each scheme for determining the forming tool contour utilizes the resulting cross sectional elements 211.

Figure 11B:
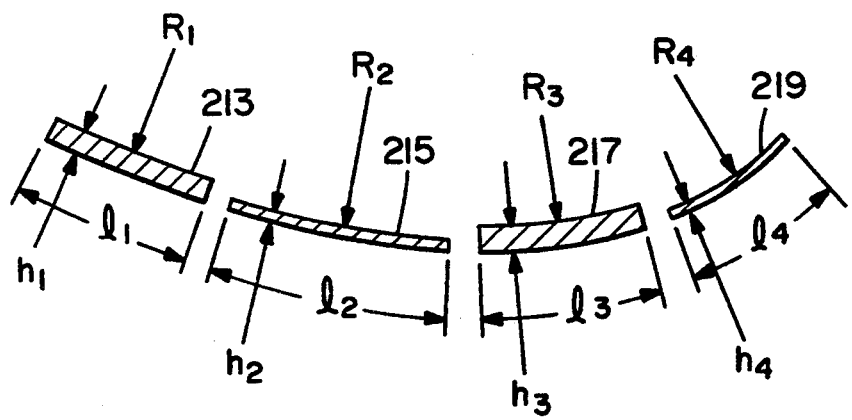
FIG. 11B is a diagrammatic representation of a plurality of segments resulting from the cross sectional element of FIG. 11A.

Each cross section as represented by its associated cross sectional element 211 provides information concerning shape and thickness variation. For the first scheme of determining the forming tool contour, each cross sectional element is divided into segments 213, 215, 217, 219, respectively, containing substantially similar thickness ($h_1$, $h_2$, $h_3$, $h_4$, respectively) and substantially similar radius ($R_1$, $R_2$, $R_3$, $R_4$, respectively) combinations, each with a corresponding length ($l_1$, $l_2$, $l_3$, $l_4$, respectively) as shown in FIG. 11B. Depending upon the cross section, several segments may come from a single cross sectional element. The next step is to determine what forming tool radius would be required to produce the shape of the segments described above.

Figure 12:
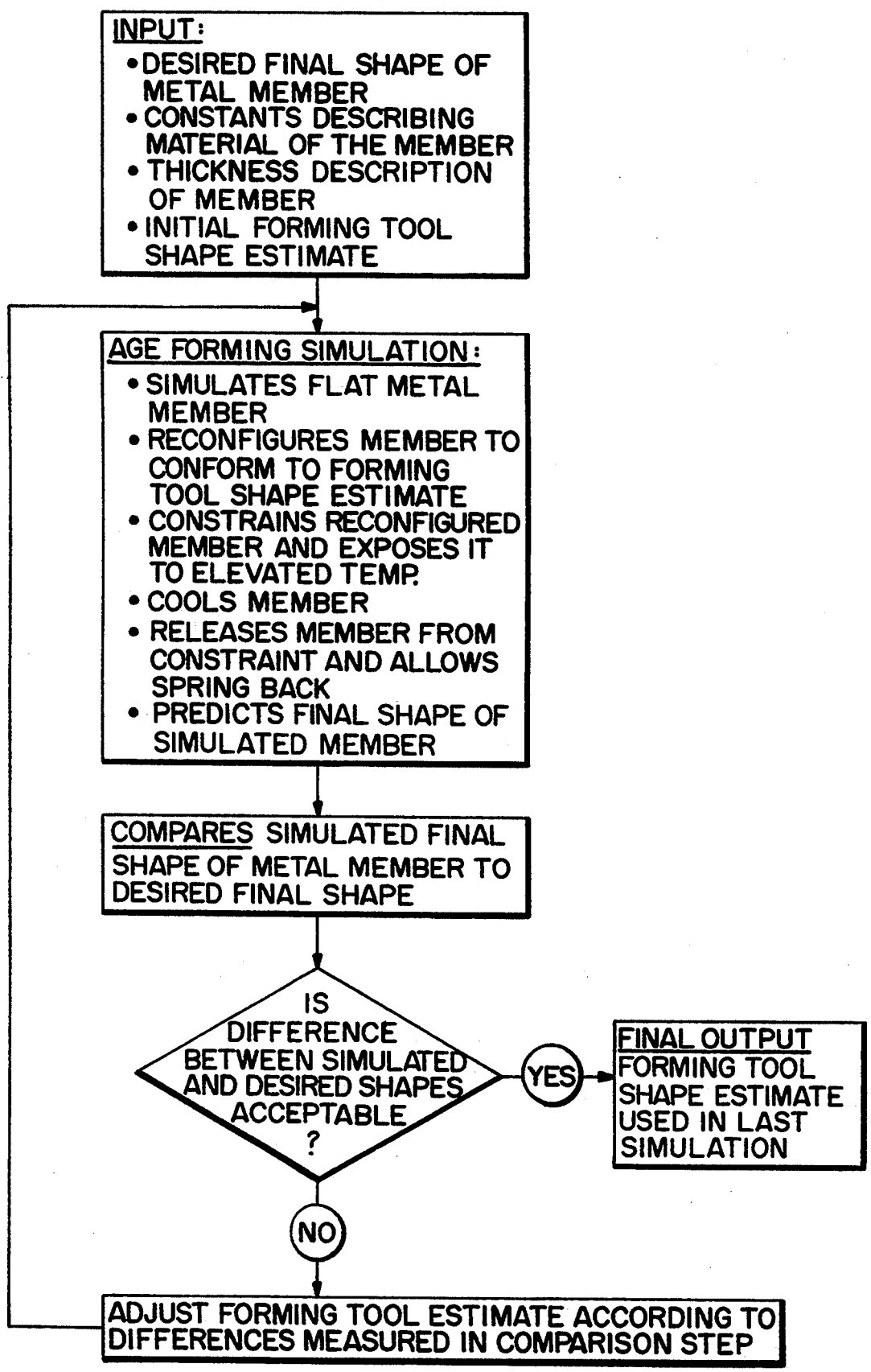
FIG. 12 is a process flow chart presenting the method of the invention in more specific terms.

At this point the simulation model is used. The simulation model simulates age forming as applied to a flat specimen being formed upon a specifically shaped tool. The model accurately predicts the final shape of the specimen having undergone the age forming method. In order to fully utilize the simulation, it is necessary to vary the shape of the forming tool and compare the results of the predicted final shape with the shape of the segment being sought. For each segment, the desired radius sought in the segment, its length, and its thickness are supplied to the simulation model. The model creates a member having a length and a thickness equivalent to the segment being analyzed. An initial tool radius which is smaller than the radius of the segment being analyzed is supplied to the simulation model. The model then simulates the age forming of the created member as if formed against this initial tool radius. The final radius produced by the simulation is then compared to the desired radius of the segment being analyzed. Predetermined values are established in the simulation model as being acceptable differences between simulated and desired values. If the differences between the desired and simulated radii are not acceptable, then the simulated forming tool radius is adjusted according to these differences. The simulation is performed using the new tool radius, and comparisons are made again. The scenario continues in an iterative fashion until the differences between the simulated and desired radii are within acceptable levels. Once the differences are acceptable, the forming tool radius utilized by the simulation is outputed as the forming tool radius required to age form a member of the specified thickness to the desired final radius. This simulation is continued for each different thickness and radius combination represented by each segment. A flow chart illustrating the use of the simulation model for this scheme is shown in FIG. 12.

Figure 13:
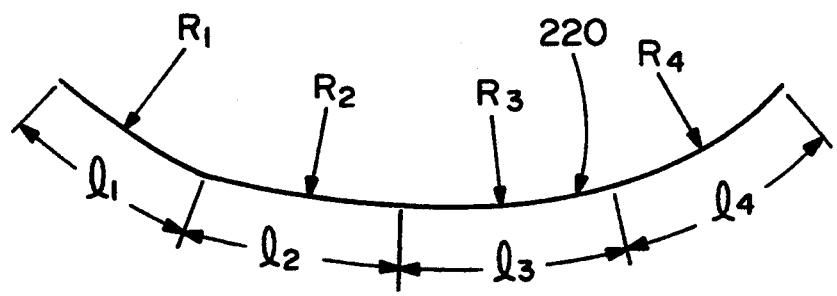
FIG. 13 presents a graphic illustration of the method by which a smooth continuous curve is achieved utilizing the present invention.
Figure 14:
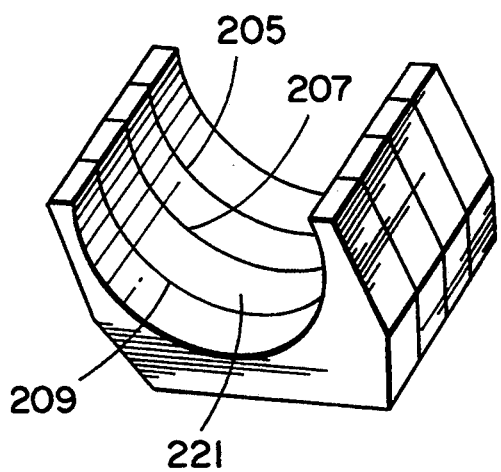
FIG. 14 is a detail perspective view of a part of a tool resulting from the method of the present invention.

With this technique, a forming tool radius is produced for each segment. A composite forming tool contour for the entire cross-sectional element is then determined by tangentially attaching the tool radii of adjoining segments in respective order, each having the length of the original segment. See FIG. 13. This creates the tool contour 220 needed to produce the cross-sectional element shape. To determine the surface of the three-dimensional forming tool surface, each forming tool curve is relocated in the plane for example, planes 205, 207, 209, from which the original cross-sectional element came. Once all of the forming tool curves are in place, they are smoothly connected by fairing in a finished surface 221 (FIG. 14) between them with the aid of an electronic three-dimensional graphic system such as that known by the trademark "CATIA". This finished surface 221 represents the definition of the forming tool contour.

Figure 15:
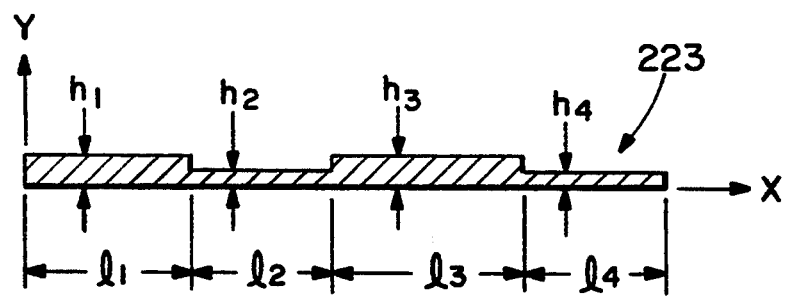
FIG. 15 is a diagrammatic view of a flattened cross sectional element enabling its measurement on Cartesian coordinates.

A second scheme exists for determining forming tool contours utilizing the age forming simulation model. Similar to the first scheme, again viewing FIG. 10B, the desired metal member 203 is analyzed with conveniently spaced apart planes 205, 207, 209 perpendicular to the tool reference plane 201 (FIG. 10A). Once again these planes are oriented across the contour and create cross sectional elements. Unlike the first scheme, however, the entire cross sectional element 211 is considered at once by the computer simulation. The element is first analyzed by considering its thickness profile. This can be done by considering the cross sectional element as a series of segments as in FIG. 11B. From this, a flat panel thickness profile 223 can be determined as seen in FIG. 15. This allows the panel to be described by a coordinate system where the y-axis (ordinate) represents thickness ($h_1$, $h_2$, $h_3$, $h_4$, respectively) and the x-axis (abscissa) represents distance across the panel ($l_1$, $l_2$, $l_3$, $l_4$, respectively). This information is provided to the simulation model. Additionally, the shape of the cross sectional element 211 is described in terms of an x-y coordinate system. Also, the initial forming tool contour is approximated as having the same basic shape as the cross sectional element but containing smaller radii of curvature. The forming tool contour is also described in terms of an x-y coordinate system. Both it and the cross sectional element coordinates are supplied to the simulation model. The measurement of the x-y coordinates of each of these shapes is facilitated by the use of the electronic graphics package noted above. Alternatively, the shape of the cross sectional element and the shape of the forming tool contour could be described as a mathematical expression and be supplied to the computer simulation in that form.

With the thickness profile and the shape description available, the computer simulation model is ready to operate. The model creates a simulated metal member of uniform width containing the thickness profile of the cross sectional element. The model simulates this created member being age formed against the approximated forming tool shape. The simulation concludes by describing the final shape of the created member after it experiences spring back. The final shape of the created member is compared to the shape of the cross sectional element. If the initial approximation of the forming tool shape is correct, then no difference will be found between the shape of the simulated age formed member 225, represented by dash lines in FIG. 16, and the shape of the cross sectional element 211, represented by solid lines in FIG. 16.

Figure 16:
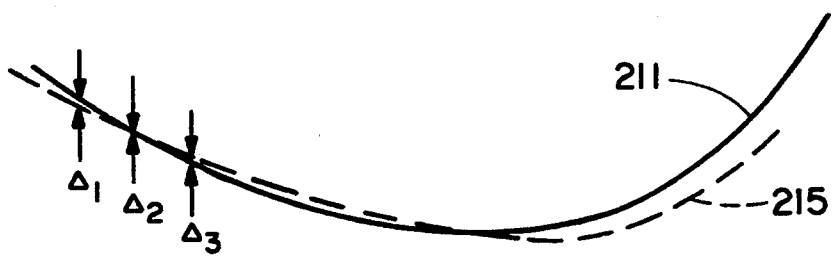
FIG. 16 is a diagrammatic representation depicting a comparison between the shape of a simulated age formed member and the shape of a cross sectional element.

A comparison between these two shapes can be made by taking the vertical difference between them at various x-coordinate locations ($\Delta_1$, $\Delta_2$, $\Delta_3$), also as shown in FIG. 16. Each difference can be compared to a predetermined tolerance value to establish whether or not the differences are acceptable. If the differences are not acceptable, then the simulated forming tool shape is adjusted and the age forming simulation is performed again using the same created member as before. The differences indicate the amount of underform or overform that occurs in the simulated member as compared to the cross sectional element. The simulated forming tool shape is adjusted by adding or subtracting the differences measured between the simulated age formed member and the cross section element. For instance, if the comparison indicates the simulated age formed member is underformed at a particular x-location, then the simulated forming tool is redefined as having more deflection at that particular location, the amount being equal to the difference between the simulated member and the actual cross sectional element.

This iterative process continues until the differences measured are within the acceptable tolerance level. The simulated forming tool contour used to produce the acceptable created member shape is outputted from the simulation program in either an x-y coordinate format or as a mathematical expression. This represents the tool contour needed to produce the cross sectional element.

With this information for each cross sectional element, the three-dimensional tooling is created in the same manner as described with respect to the first scheme.

A third scheme for determining forming tool contour is very similar to the first scheme in the way it analyzes the complex shaped member to be formed.

Figure 17:
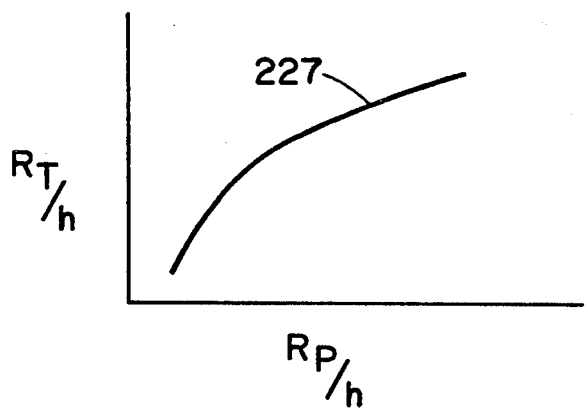
FIG. 17 is a graph depicting, for a range of thicknesses of a member to be formed, the relationship between the radius of curvature of a forming tool and the radius of curvature of the formed part.

Conveniently spaced planes are utilized and cross sectional elements are created. Segments of each element are determined from sections having substantially similar radii and substantially similar thicknesses, each with a corresponding length. The great difference between the two schemes is in the manner in which the age forming simulation is utilized. In the first scheme, the simulation model is used to determine unique forming tool radii for each segment. In this scheme, the simulation model is used to prepare a general relationship between forming tool radii and formed members. This method is attractive in that simulations can be run for a given material prior to any knowledge of the shape of the complex member requiring form. The relationship is developed by simulating the forming of a range of thickness against a variety of forming tool radii where $R_T$ is tool radius, $R_p$ is part radius, and h is part thicknesss. This relationship can be displayed graphically as shown in FIG. 17. With this relationship, each segment can be analyzed according to its thickness and final formed radius. The resulting tool radii can be used to create a composite tool curve 227 for the entire cross sectional element similar to the first scheme shown in FIG. 13. The forming tool curves can be located in their respective planes, then faired together into a surface to define the complete forming tool surface.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method of age forming a desired metal member having a surface contour of complex shape from an unformed member including the steps of
   (a) overforming the unformed member in a forming tool having a contour of smaller curvature than the contour of the desired member;
   (b) constraining the unformed member in the overformed condition;
   (c) applying a thermal aging cycle to the member;
   (d) cooling the constrained member following the thermal aging cycle;
   (e) releasing the constrained member from the condition imparted by step (b) and allowing it to spring back to a dimensionally stable condition which defines the desired member having a surface contour of complex shape;

and predicting the surface contour of the forming tool comprising the steps, prior to performing steps (a) through (e), of:

(f) simulating mathematically the application of steps (a) through (e) solely on a model representing the shape of a member having the material properties of the desired metal member; and (g) determining from step (f) the contour of smaller curvature in step (a) enabling the desired metal member to be produced upon the completion of step (e).

2. A method as set forth in claim 1 wherein step (f) includes the step of:

(h) predicting the behavior of the desired metal member during steps (a) through (e) as a function of physical phenomena exhibited by the member including elastic deformation, inelastic deformation, creep, and stress relaxation.

3. A method as set forth in claim 2 wherein step (c) includes the step of:

(j) raising the temperature of the metal member at a predetermined rate to a predetermined temperature; wherein the step (a) includes the step of:

(k) applying substantially uniformly distributed pressure on the metal member to conform to the contour of the tool resulting in elastic and inelastic deformation of the metal member; and wherein step (b) includes the step of:

(l) holding the metal member against the tool for a predetermined time according to the thermal aging cycle whereby stress relaxation in the metal member occurs at a substantially constant strain; and wherein step (e) includes the step of:

(m) removing the uniformly distributed pressure from the metal member thereby allowing the remaining stresses in the member to decrease substantially to zero.

4. A method s set forth in claim 3 wherein step (g) includes the step of:

(n) predicting the radius of curvature of the metal member resulting from both metallurgical and mechanical stress relaxation under deformation to achieve in the metal member the dimensionally stable condition which defines the desired metal member having a surf ace contour of complex shape.

5. A method as set forth in claim 2 wherein step (h) includes the step of:

(i) modelling the physical phenomena exhibited by the desired metal member according to the following relationships:

$$\dot{\sigma} + (E/\tau)(\sinh(\sigma^2/(E^2 f)))^n = E\dot{\epsilon}$$

$$\dot{f} = (\alpha/\tau)((\sinh(\sigma^2/(E^2 f)))^n - (\sinh(\beta^2 f))^n)$$

wherein:
$\sigma$ = stress
$\epsilon$ = strain
f = internal variable
$\alpha, \beta, f_o, n$ = material constants
E = Young's modulus of elasticity
$\tau$ = relaxation time.

6. A method as set forth in claim 2 wherein step (h) includes the step of:

(i) modelling simultaneously the mechanical and geometrical properties of the desired metal member according to the following relationships:

$$\dot{\sigma}_i = -((E/\tau)(\sinh(\sigma_i^2/(E^2 f)))^n + 3l^2 p/(2h^2)) -$$

$$(24E/(\tau h^2)) \int_0^{h/2} (\sinh(\sigma^2/(E^2 f)))^n y dy)(y/h)); \, i = 1, 2, \ldots, N$$

$$\dot{f}_i = (\alpha/\tau)((\sinh(\sigma_i^2/(E^2 f)))^n - (\sinh(\beta^2 f))^n); \, i = 1, 2, \ldots, N$$

$$\dot{\kappa} = \left( 3l^2 \dot{p}/(2Eh^2) - (24/(\tau h^2)) \int_0^{h/2} (\sinh(\sigma^2/(E^2 f)))^n y dy \right)/h$$

wherein:
$\alpha$ = stress
f = internal variable
E = Young's modulus of elasticity
$\tau$ = relaxation time
p = pressure
h = thickness
l = length
y = y axis vertically upward (the undeformed neutral axis corresponds to y=0)
$\kappa$ = curvature
$\beta, \alpha, n,$ = material constants.

7. A method as set forth in claim 1 wherein step (f) includes the step of:

(h) modelling simultaneously the mechanical and geometrical properties of the desired metal member according to the following relationships:

$$\dot{\sigma}_i = (E/\tau)(\sinh(\sigma_i^2/(Ef)))^n; \, i = 1, 2, \ldots, N$$

$$\dot{f}_i = (\alpha/\tau)((\sinh(\sigma_i^2/(E^2 f)))^n - (\sinh(\beta^2 f))^n);$$

$$i = 1, 2, \ldots, N$$

$$\dot{p} = (16E/(\tau l^2)) \int_0^{h/2} (\sinh(\sigma^2/(E^2 f)))^n y dy$$

wherein:
$\sigma$ = stress
f = internal variable
E = Young's modulus of elasticity
$\tau$ = relaxation time
p = pressure
h = thickness
l = length
y = y axis vertically upward (the undeformed neutral axis corresponds to y=0)
$\beta, \alpha, n,$ = material constants.

8. A method as set forth in claim 1 wherein the desired metal member is composed of an age formable metal alloy.

9. A method as set forth in claim 1 wherein the desired metal member is composed of an age formable aluminum alloy.

10. A method as set forth in claim 1 wherein step (f) includes the step of:

(t) predicting a relationship between the radius of curvature of the contour of the desired metal member and the radius of curvature of the forming tool; and wherein the step (g) includes the step of:

(u) knowing the radius of curvature of the desired metal member, determining from the relationship of step (t) the radius of curvature of the forming tool.

11. A method as set forth in claim 1 wherein step (f) includes the steps of:

(h) providing a geometrical representation of the desired complex shaped metal member;

(i) passing a plurality of spaced apart planes through the geometrical representation of the desired member at spaced apart locations to thereby form a plurality of cross sectional elements;

(j) dividing each of the cross sectional elements into a plurality of segments, each segment having a length and a substantially uniform thickness and a substantially uniform radius of curvature; and wherein the step (g) includes the steps of:

(k) determining from the simulation of step (f) a radius of curvature of the forming tool for each radius of curvature sought for each segment; and (l) from the tool radii calculated in step (k), developing tool curves for each cross sectional element for each of the planes of step (i);

(m) locating each tool curve determined in step (l) in each respective plane of step (i) in which its associated cross sectional element is located; and (n) joining the adjacent tool curve for all of the planes to thereby develop a surface contour for the tool.

12. A method as set forth in claim 11 wherein step (k) includes the steps of:

(o) providing an initial estimate of the radius of curvature of the tool to obtain the radius of curvature for each segment obtained in step (j);

(p) measuring the thickness, length, and radius of curvature of each segment obtained in step (j);

(q) predicting the final radius of curvature of a metal member having, in succession, the dimensions of each segment as obtained in step (p), upon the conclusion of steps (a) through (e) utilizing the radii of curvature estimates of step (o);

(r) comparing the final radius of curvature of the metal member obtained as a result of step (q) with that, successively, of the radius of curvature of each segment measured in step (p); and (s) preserving for the determination of step (k) the estimate of the radius of curvature of the tool provided in step (o) for each segment in the event the differences determined in step (r) between the final radius of curvature of the metal member and the successive radii of curvature of the segments are less than a predetermined value.

13. A method as set forth in claim 12
wherein, in the event the differences between the radius of curvature of the predicted metal member of step (q) and the radius of curvature of the desired metal member are greater than a predetermined value, a revised initial estimate of the radius of curvature of the tool is provided in step (o); and wherein steps (q) and (r) are repeated until the differences determined in step (r) between the radius of curvature of the predicted metal member and the radius of curvature of the desired metal member are less than the predetermined value.

14. A method as set forth in claim 11 wherein step (l) includes the steps of:

(o) measuring the length of each segment obtained in step (j); and (p) tangentially connecting tool curves for the respective lengths of the adjacent segments as measured in step (o) to achieve a smooth composite tool curve for the entire cross sectional element.

15. A method as set forth in claim 1
wherein step (f) includes the steps of:

(h) providing a three-dimensional computer generated graphical representation of the desired complex shaped metal member;

(i) passing a plurality of mathematically defined spaced apart planes through the graphical representation of the desired member at spaced apart locations to thereby form a plurality of mathematically defined cross sectional elements;

(j) dividing each of the mathematically defined cross sectional elements into a plurality of mathematically defined segments, each having a substantially uniform thickness and a substantially uniform radius of curvature; and wherein step (g) includes the steps of:

(k) determining from the simulation of step (f) a radius of curvature of the forming tool for each radius of curvature sought for each mathematically defined segment; and (l) from the tool radii calculated in step (k), developing tool curves for each of the mathematically defined planes of step (i) and thereby developing a mathematically defined surface contour for the tool;

(m) locating each tool curve developed in step (l) in each respective plane of step (i) in which its associated mathematically defined cross sectional element is located; and (n) joining the adjacent tool curves for all of the planes to thereby develop a mathematically defined surface contour for the tool.

16. A method as set forth in claim 15 wherein step (k) includes the steps of:

(o) providing an initial estimate of the radius of curvature of the tool to obtain the radius of curvature for each segment obtained in step (j);

(p) measuring the thickness and radius of curvature of each segment obtained in step (j);

(q) predicting the final radius of curvature of a metal member having, in succession, the dimensions of each segment as obtained in step (p), upon the conclusion of steps (a) through (e) utilizing the radii of curvature estimates of step (o);

(r) comparing the final radius of curvature of the metal member obtained as a result of step (q) with that, successively, of the radius of curvature of each segment measured in step (p); and (s) preserving for the determination of step (k) the estimate of the radius of curvature of the tool provided in step (o) provided for each segment in the event the differences determined in step (r) between the final radius of curvature of the metal member and the successive radii of curvature of the segments are less than a predetermined value.

17. A method as set forth in claim 16
wherein, in the event the differences between the radius of curvature of the predicted metal member of step (q) and the radius of curvature of the desired metal member are greater than a predetermined value, a revised initial estimate of the radius of curvature of the tool is provided in step (o); and wherein steps (q) and (r) are repeated until the differences determined in step (r) between the radius of curvature of the predicted metal member and the radius of curvature of the desired metal member are less than the predetermined value.

18. A method as set forth in claim 15 wherein step (l) includes the steps of:

(o) measuring the length of each segment obtained in step (j); and (p) tangentially connecting tool curves for the respective lengths of the adjacent segments as measured in step (o) to achieve a smooth composite tool curve for the entire cross sectional element.

19. A method as set forth in claim 1 wherein step (f) includes the steps of:

(h) providing a geometrical representation of the desired complex shaped member;

(i) passing a plurality of spaced apart planes through the geometrical representation of the desired member at spaced apart locations to thereby form a plurality of cross sectional elements; and wherein step (g) includes the steps of;

(j) determining from the simulation of step (f) the contour of the forming tool for each cross sectional element; and (k) from the forming tool contour determined in step (j) locating a tool curve for each respective plane of step (i) in which its associated cross sectional element is located; and (l) joining the adjacent tool curves for all of the planes to thereby develop a surface contour for the tool.

20. A method as set forth in claim 19 wherein step (j) includes the steps of:

(m) providing an initial estimate of the contour of the tool to obtain the contour of the desired metal member;

(n) dividing each of the cross sectional elements into a plurality of segments, each segment having a length and a substantially uniform thickness;

(o) measuring the thickness and length of each segment obtained in step (n);

(p) predicting the final contour of a metal member having the dimensions of the cross sectional element comprised of the segments of step (n) upon the concluding of steps (a) through (e) utilizing the tool contour estimates of step (m);

(q) comparing the final metal member contour obtained as a result of step (p) with that of the desired metal member; and (r) preserving for the determination of step (j) the estimated tool contour of step (m) in the event the differences determined in step (q) between the final metal member contour and the desired metal member contour are less than a predetermined value.

21. A method as set forth in claim 20 wherein, in the event the differences between the predicted metal member contour of step (p) and the desired metal member contour are greater than a predetermined value, a revised initial estimate of tool contour is provided in step (n); and wherein steps (p) and (q) are repeated until the differences determined in step (q) between the predicted metal member contour and the desired metal member contour are less than the predetermined value.

22. A method as set forth in claim 1 wherein step (f) includes the step of:

(h) predicting a relationship between the radii of curvature of a plurality of metal members having a uniform width and length and each having a plurality of different thicknesses, and a plurality of forming tool radii, and including the steps of:

(i) providing a geometrical representation of the desired complex shaped metal member;

(j) passing a plurality of spaced apart planes through the geometrical representation of the desired member at spaced apart locations to thereby form a plurality of cross sectional elements;

(k) dividing each of the cross sectional elements into a plurality of segments, each segment having a length and a substantially uniform thickness and a substantially uniform radius of curvature;

(l) measuring the length, the thickness, and the radius of curvature of each segment obtained in step (k);

(m) knowing the radius of curvature of each segment obtained in step (k), determining from the predicted relationship of step (h) a radius of curvature of the forming tool for each radius of curvature sought for each segment; and (n) from the tool radii determined in step (m), developing tool curves for each cross sectioned element for each of the planes of step (j);

(o) locating each tool curve determined in step (n) in each respective plane of step (j) in which its associated cross sectional element is located; and (p) joining the adjacent tool curves for all of the planes to thereby develop a surface contour for the tool.

23. A method as set forth in claim 22 wherein step (n) includes the step of:

(q) tangentially connecting tool curves for the respective lengths of the adjacent segments as measured in step (l) to achieve a smooth composite tool curve for the entire cross sectional element.

24. A method as set forth in claim 1 wherein step (f) includes the step of:

(h) predicting a relationship between the radii of curvature of a plurality of metal members having a uniform width and length and each having a plurality of different thicknesses, and a plurality of forming tool radii, and wherein step (g) includes the step of:

(i) knowing the radius of curvature of the desired metal member, determining from the predicted relationship of step (h) the radius of curvature of the forming tool.

* * * * *

UNITED STATES PATENT AND TRADEMARK OFFICE
CERTIFICATE OF CORRECTION

PATENT NO. : 5,341,303
DATED : Aug. 23, 1994
INVENTOR(S) : Foroudastan et al.

It is certified that error appears in the above-identified patent and that said Letters Patent is hereby corrected as shown below:

In column 19, lines 53 - 55, delete the relationships recited and replace with the following:

$$\dot{\sigma} + (E/\tau)(\sinh(\sigma^2/(E^2 f)))^n = E\dot{\varepsilon}$$
$$\dot{f} = (\alpha/\tau)((\sinh(\sigma^2/(E^2 f)))^n - (\sinh(\beta^2 f))^n)$$
$$f(0) = f_0$$

In column 20, line 14, replace "$\alpha$" with --$\sigma$--

In column 23, line 40, replace "concluding" with --conclusion--.

Signed and Sealed this

Twenty-second Day of November, 1994

Attest:

BRUCE LEHMAN

Attesting Officer

Commissioner of Patents and Trademarks